United States Patent [19]

Thompson et al.

[11] Patent Number: 4,630,145

[45] Date of Patent: Dec. 16, 1986

[54] FINE POSITIONING APPARATUS FOR FLOPPY DISK DRIVE

[75] Inventors: Herbert E. Thompson, Los Gatos; Duane C. Meulners, San Jose, both of Calif.

[73] Assignee: Drivetec, Inc., Milpitas, Calif.

[21] Appl. No.: 622,768

[22] Filed: Jun. 20, 1984

Related U.S. Application Data

[63] Continuation-in-part of Ser. No. 348,831, Feb. 16, 1982, abandoned.

[51] Int. Cl.[4] .............................................. G11B 5/56
[52] U.S. Cl. ......................................... 360/77; 360/78; 360/106
[58] Field of Search ................... 360/69, 75, 77, 78, 360/103, 104, 105, 106

[56] References Cited

U.S. PATENT DOCUMENTS

| | | | |
|---|---|---|---|
| 3,691,543 | 9/1972 | Mueller | 340/174 |
| 3,855,622 | 12/1974 | Truscelli et al. | 360/103 |
| 3,924,268 | 12/1975 | McIntosh et al. | 360/77 |
| 4,012,791 | 3/1977 | Bleiman | 360/105 |
| 4,032,984 | 6/1977 | Kaser et al. | 360/77 |
| 4,048,660 | 9/1977 | Dennison et al. | 360/77 |
| 4,122,503 | 10/1978 | Allan | 360/78 |
| 4,149,200 | 4/1979 | Card | 360/77 |
| 4,149,201 | 4/1979 | Card | 360/77 |
| 4,204,234 | 5/1980 | Noble | 360/77 |
| 4,208,679 | 6/1980 | Hertrich | 360/77 |

Primary Examiner—George G. Stellar
Attorney, Agent, or Firm—Hamrick, Hoffman, Guillot & Kazubowski

[57] ABSTRACT

A positioning system for a magnetic disk storage system. A first and second lead screw connected to their respective stepper motors are mechanically connected by a lever arm that adds these motions. The first stepper motor is controlled by an open loop control circuit and the second stepper motor is controlled by a closed loop circuit that reads servo information off the magnetic disk. The head is constantly repositioned to follow track eccentricities and can accurately read very closely spaced tracks on non-rigid disks.

16 Claims, 11 Drawing Figures

FIG_1

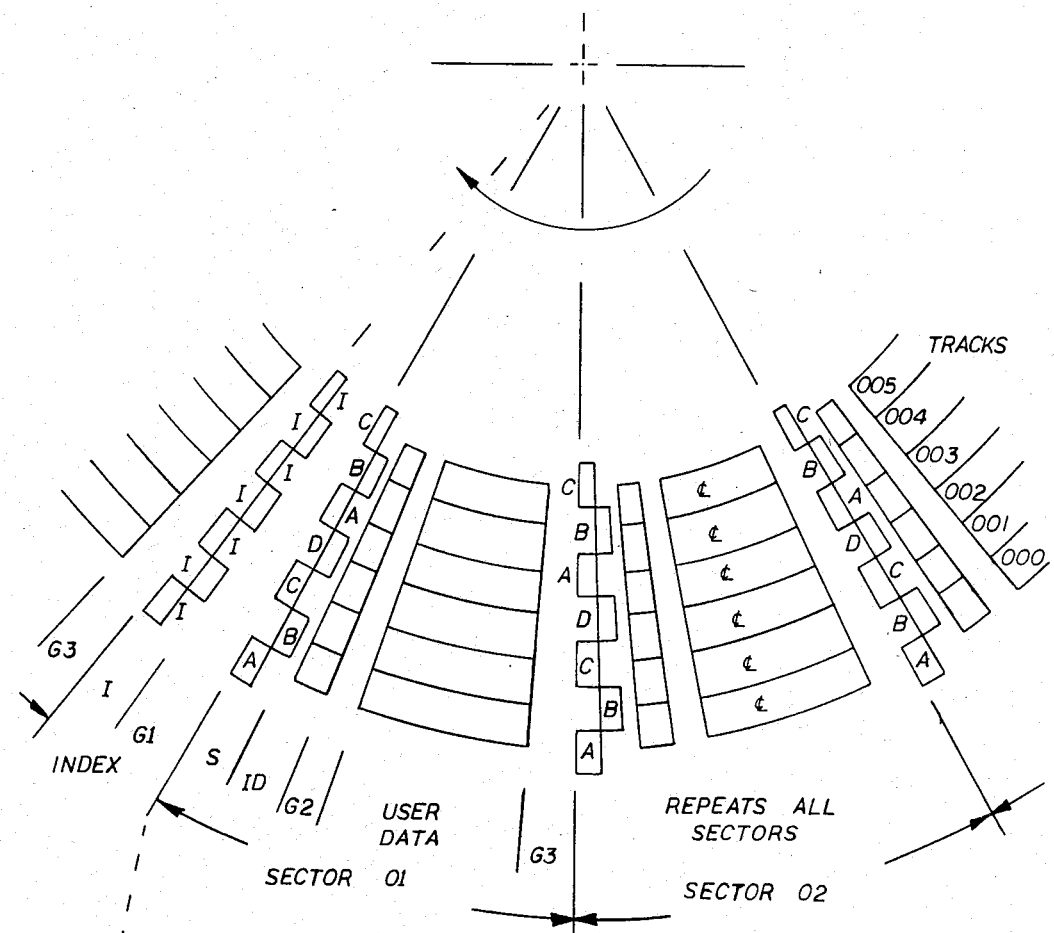
FIG. 3
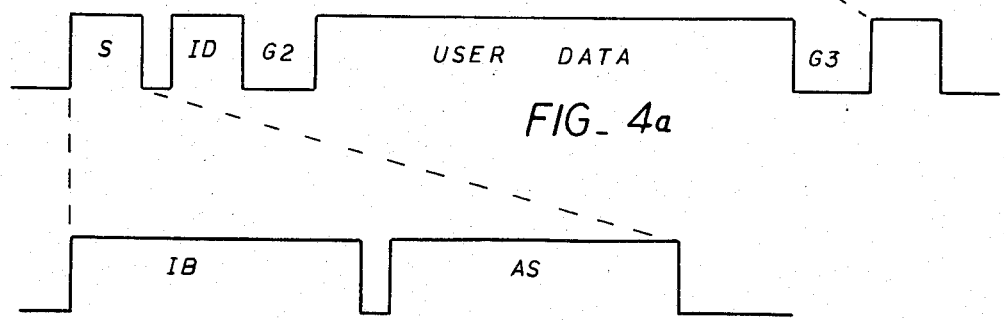
FIG. 4a
FIG. 4b

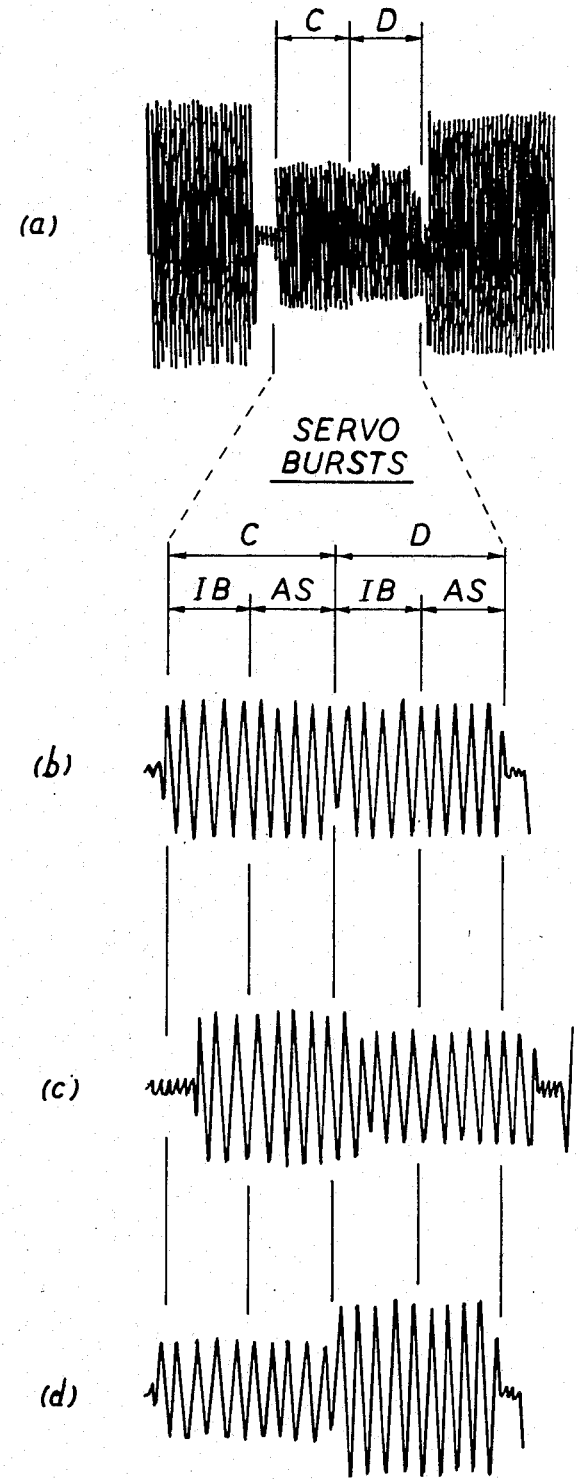
FIG_ 5

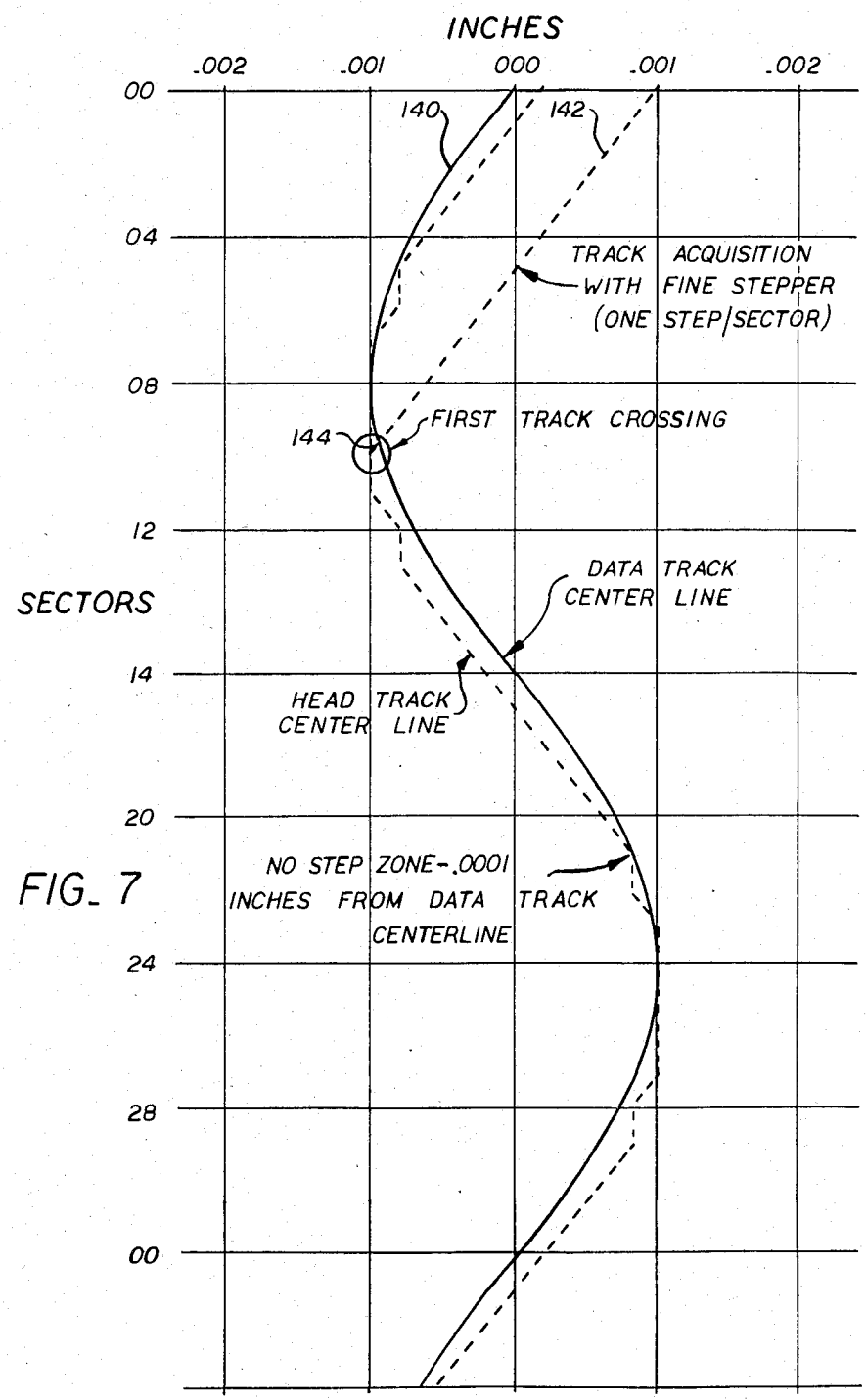
FIG_7

FINE POSITIONING APPARATUS FOR FLOPPY DISK DRIVE

This application is a continuation-in-part of our copending application entitled "Coarse And Fine Positioning System", Ser. No. 348,831, filed Feb. 16, 1982 now abandoned.

BACKGROUND OF THE INVENTION

1. Field of the Invention

This invention relates to apparatus and methods for storing data on disks. In particular, this invention relates to high density data storage on floppy disks.

2. Related Applications

This application is also related to the following copending U.S. Patent Applications assigned to the assignee of the present inventions: "Mechansim For Clamping And Spinning A Flexible Disk", Ser. No. 428,936, filed Sept. 30, 1982, now abandoned; "A Mechanism For Clamping and Spinning A Flexible Disk", Ser. No. 428,944, filed Sept. 30, 1982; and "Flexible Magnetic Disk Clamping An Ejector Mechanism" Ser. No. 495,801, filed May 18, 1983, now U.S. Pat. No. 4,539,614.

3. Description of the Prior Art

A present "state of art" flexible or floppy disk drive records data on a series of concentric tracks on a rotated flexible magnetic disk. A transducer or magnetic read/write head is positioned near a desired track by an open loop stepper motor which has a predetermined increment of motion equal to one track per step. Conventional floppy disks have either 48 or 96 tracks per inch of disk radius. The motor is stepped with serial step pulses on command of the disk drive control unit, which maintains a count of the track position. When the head is moved to another track, the control unit will issue to the disk drive a polarity signal for direction and appropriate numbers and serial step pulses for distance. If the head is not properly aligned to a track, the head will read signals from the adjacent track, or from the previously written track, which will appear as noise to the desired signal. If the noise-to-signal ratio is large, the desired signal will be in error. There are three important factors which cause the head to be misaligned to the tracks:

1. the flexible disk is removable and upon reinsertion an eccentric misclamping error may occur;
2. the flexible disk expands and contracts in a non-uniform manner due to humidity and temperature variations; and
3. the stepper motor and actuator have inaccuracies that misalign the head.

To overcome these problems, it becomes necessary to "follow" the tracks with the head. When the track density is small, the head can be equipped with a trim erase element which can erase a clean zone on either side of the track. As the track densities are increased, the misalignment error may approach or become larger than the track spacing. The noise-to-signal ratio then becomes very large and the desired signal cannot be read. Additionally, trim erase elements will erase a portion of the adjacent track causing a further increase in the noise-to-signal ratio.

If the trim erase elements are removed from the head as a cost effective measure, it is necessary that the head-to-track error be no greater than plus or minus 0.0005 inches to assure favorable noise to signal ratio. A position error feedback to the head carriage actuator is required if the head is to follow the track with this accuracy. The device used to perform this function is commonly called a closed loop servomechanism. A conventional closed loop servomechanism requires both a continuous, off-track error signal and a velocity feedback signal. The head-to-track position error is continuously being reduced towards zero in an analog or continuous manner with a control velocity profile. The continuous source of the error signal is derived from dedicated servo tracks and the velocity feedback requires the use of a separate velocity transducer. This method is inefficient because a large portion of the data capacity of the drive is used to provide the error signal, and the velocity transducer adds cost and increases servo control complexity.

Various types of head positioners are known. A screw stepper has one stepper motor with a screw that is threaded through a follower. The follower is mounted on a carriage for driving the head inwardly and outwardly with respect to the lead screw. Advantages of the screw stepper include accuracy, good wear life, and non-accumulating error at a reasonable cost. A disadvantage is the possible incremental nut wear that can reduce positioning accuracy. A band stepper has a motor, capsan and a band trained about the capsan for moving the head carriage linearly with respect to the stationary frame. Band steppers are economical and fast, but have poor accuracy, and a tendancy for instable and noisy operation. A micro stepper has an electric motor that achieves fine steps by adjusting the current electronically so that the rotor moves in fine steps between the pole faces. Such a motor requires complex electronics and each motor has to be calibrated individually.

Various transducer positioning systems utilizing servo data in an embedded format are known. Coarse and fine radial positioning of a transducer relative to the concentric tracks of a rotatable magnetic disk having work data and servo data interspersed in alternate sectors on the disk is disclosed in U.S. Pat. Nos. 4,032,984 to Kaser et al., 4,149,200 to Card, and 4,149,201 to Card. Another example of a transducer positioning system for a rotating magnetic disk having servo positioning information interspersed with data is disclosed in U.S. Pat. No. 4,208,679 to Hertrich. A positioning system which provides a series of adjacent servo tracks, the boundary between adjacent servo tracks defining a path for the servo system to follow is shown in U.S. Pat. No. 3,691,543 to Mueller. U.S. Pat. No. 4,204,234 to Noble discloses a track following system wherein recorded data is successively sampled by a read/write head that is caused to move back and forth by a servo system towards that path defined by the maximum amplitude data signals.

SUMMARY OF THE PRESENT INVENTION

It is an object of this invention to provide a disk drive read/write head positioning system that allows the read/write head to rapidly change its radial inward and outward location to follow a track that may be eccentric.

It is a further object of this invention to provide the servo information necessary for such head following on the magnetic disk.

Another object of this invention is to provide such servo information on a small area of the data storage space of the disk in each of several sectors.

It is yet another object of this invention to step the head towards the track centerline by a predetermined discrete fine increment equal to the maximum amount of track eccentricity per sector.

It is yet a further object of this invention to provide a mechanical linkage that adds the position of a first stepper motor with the continuously changing position of a second stepper motor.

The positioning system of the present invention has a first and second lead screw means that moves a rail mounted read/write head radially inwardly and outwardly. The first lead screw means moves the rail mounted disk drive read/write head in unitary steps of coarse increment. The second lead screw moves the head in unitary steps of fine increment. The first and second lead screw means are mounted in parallel and are connected by a pivotal lever arm having a first lead screw follower and a second lead screw follower. The second lead screw follower pivots the lever arm moving the arm and the first lead screw allowing adjustment of the read/write head.

The present invention advantageously allows the continuous fine readjustment of the position of a read/write head relative to a track on a flexible magnetic recording disk.

IN THE DRAWING

FIG. 3 is a schematic diagram of the tracks and sectors of a floppy disk of the present invention;

Figure 6:
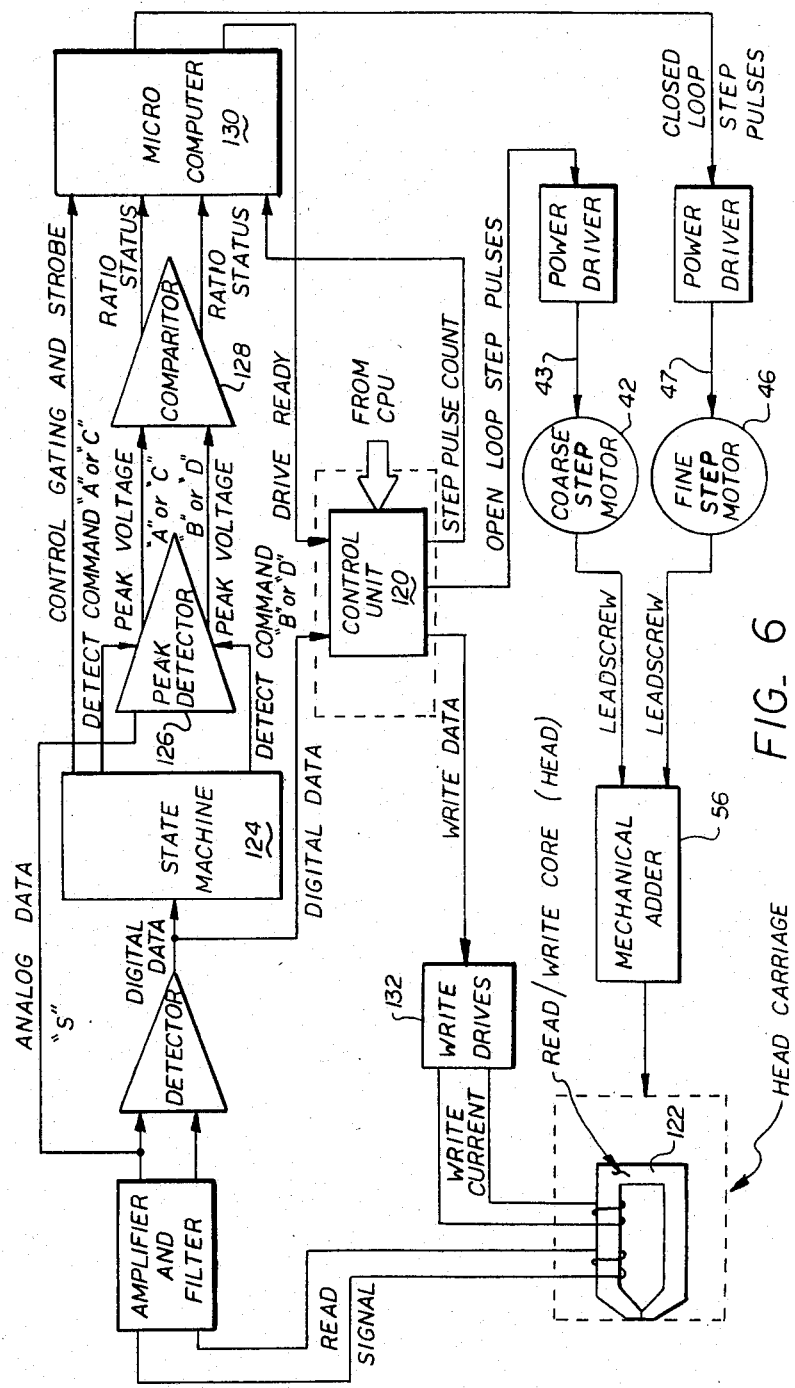

FIG. 4 consisting of FIG. 4a and 4b is a graphical representation of data fields versus track distance as read by a head;

FIG. 5 consisting of FIGS. 5a-5d is a representation of how the voltage differs for aligned and misaligned read/write heads;

FIG. 6 is a schematic circuit diagram of the disk drive of the present invention; and FIG. 7 is a graphical representation of misaligned tracks and a head following one of said tracks.

DETAILED DESCRIPTION OF THE PREFERRED EMBODIMENT

Disk drive systems that record data on and read data from flexible magnetic disks, or floppy disks as they are commonly known, are composed of several elements. The floppy disk itself is a thin Mylar ® or polyester disk that is coated with a magnetic material and is enclosed in a protective envelope having a central cut out portion providing access for spinning the disk and an elongate access slot that allows the head access to the magnetic surface.

Figure 1:
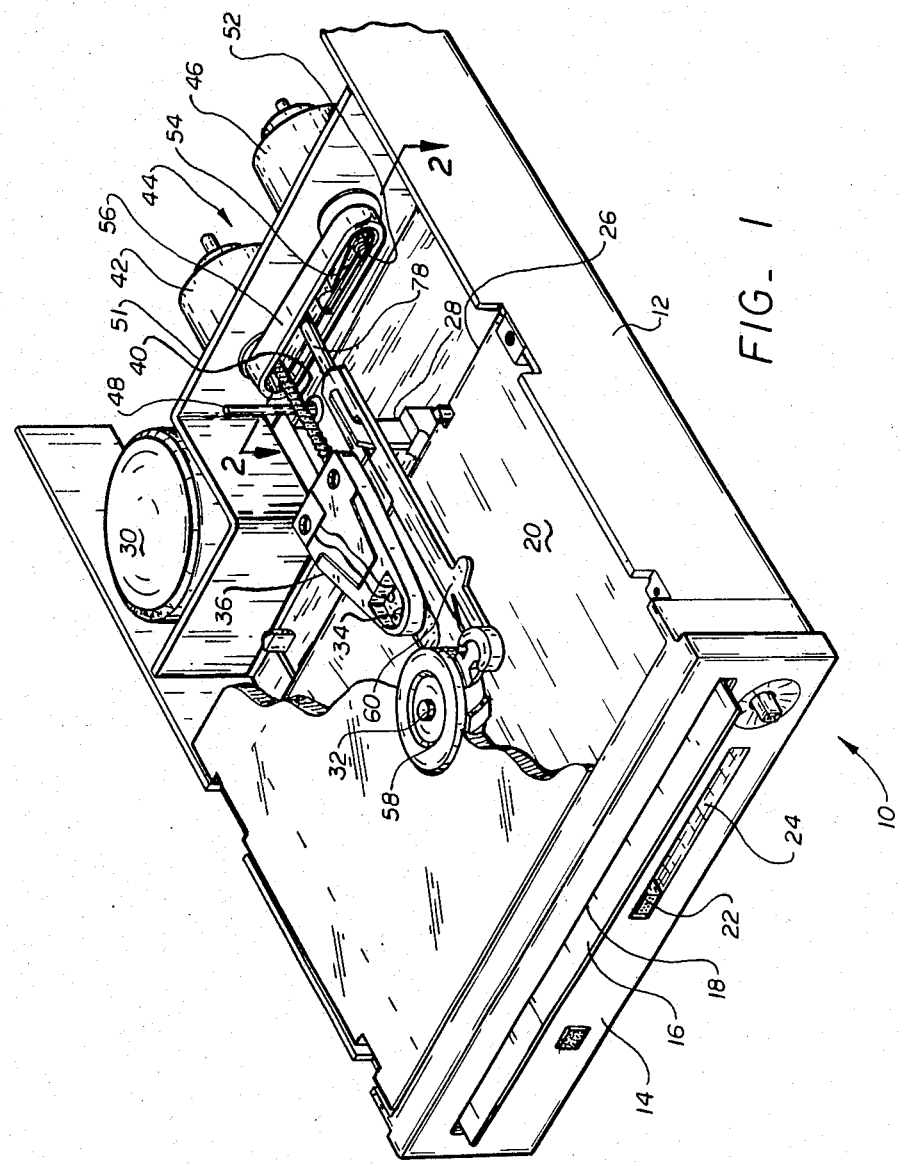
FIG. 1 is a isometric top view of a disk drive unit.

Referring to FIG. 1 of the drawing, a disk drive assembly 10 in accordance with the present invention is shown having frame with side walls 12, and a face plate 14 that is connected to the front end of the frame. A floppy disk cartridge 16, hereinafter generally referred to as the disk 16, is shown inserted into the disk drive assembly via the insertion slot 18 provided in the face plate 14. The disk is shown to be almost fully inserted into the disk receiving area 20 of the disk drive assembly. In the preferred embodiment, this area is normally covered by a printed circuit board carrying the devices electronic components, such part is not shown herein. A disk guide surface (not shown) is provided for disk support and aligning within the disk drive assembly. The end of a clamp handle 22 appears in a clamp handle recess slot 24 formed in face plate 14 and is inaccessible until the rear edge of the disk 26 is seated against the endstop lever 28.

Disk spinning is accomplished by a motor 30 connected to a driven spindle 32 by an endless band on the lower surface of the disk drive assembly (not shown). Access to the encoded data is provided by magnetic read/write head 34 attached to a head carriage 36 that is positioned so it can move radially inwardly and outwardly relative to disk 16 along carriage rails 78 and 79 (FIG. 2) driven by a lead screw 40 that is rotated by a stepper motor 42. The head carriage rails are employed to accurately guide the carriage as well as prevent rotation of the head during its linear inward and outward movement. Further details of the disk drive apparatus may be found in the above-identified copending applications and their disclosure is expressly incorporated hereby by reference.

In order to increase the density of data recording, the read/write heads are precisely positioned to tracks that are very closely spaced on the disk surface. The coarsely positioned read/write heads are initially positioned by motor 42 and then finely repositioned, when following a given track, by action of the mechanical adder assembly shown generally at 44. The adder assembly includes a lever arm 56 which axially translates lead screw 40 to adjust the fine position of the head carriage as one end thereof is driven by a second stepper motor 46 while the other end pivots about a pivot post 48.

More particularly, the first stepper motor 42, or "coarse stepper motor", is mounted on the back wall of the frame 51 and drives the first lead screw 40 that is driveably connected to the movable head carriage 36. Lead screw 40 is spring mounted in the first stepper motor so as to allow a degree of inward and outward axial movement. The second stepper motor 46, or "fine stepper motor", is mounted on the back wall of frame 51 and drives a second lead screw 52. A second lead screw follower 54 is affixed to one end of the lever arm 56 which is pivotable about the pivot post 48. Accuation of the second stepper motor causes the lever arm 56 to pivot about pin 48 moving both the first lead screw 40 and the attached read/write head carriage 36.

When a disk is inserted and the disk clamp is closed, the heads are placed in contact with the magnetic surface of the disk. The disk is firmly held and driven by the rotary spindle. In the preferred embodiment, the top portion of the spindle is mounted on the top section of the frame so that the rearward movement of a spindle engagement lever 60 rotates the spindle 58 and lowers it to firmly engage the disk for rotation. The spindle engagement lever 60 is rearwardly moved when the attached disk endstop lever 28 is rearwardly moved by the nearly completely inserted disk. For a more detailed description of the disk insertion and removal mechanism, reference is made to the previously mentioned U.S. patent application Ser. No. 495,801.

Figure 2:
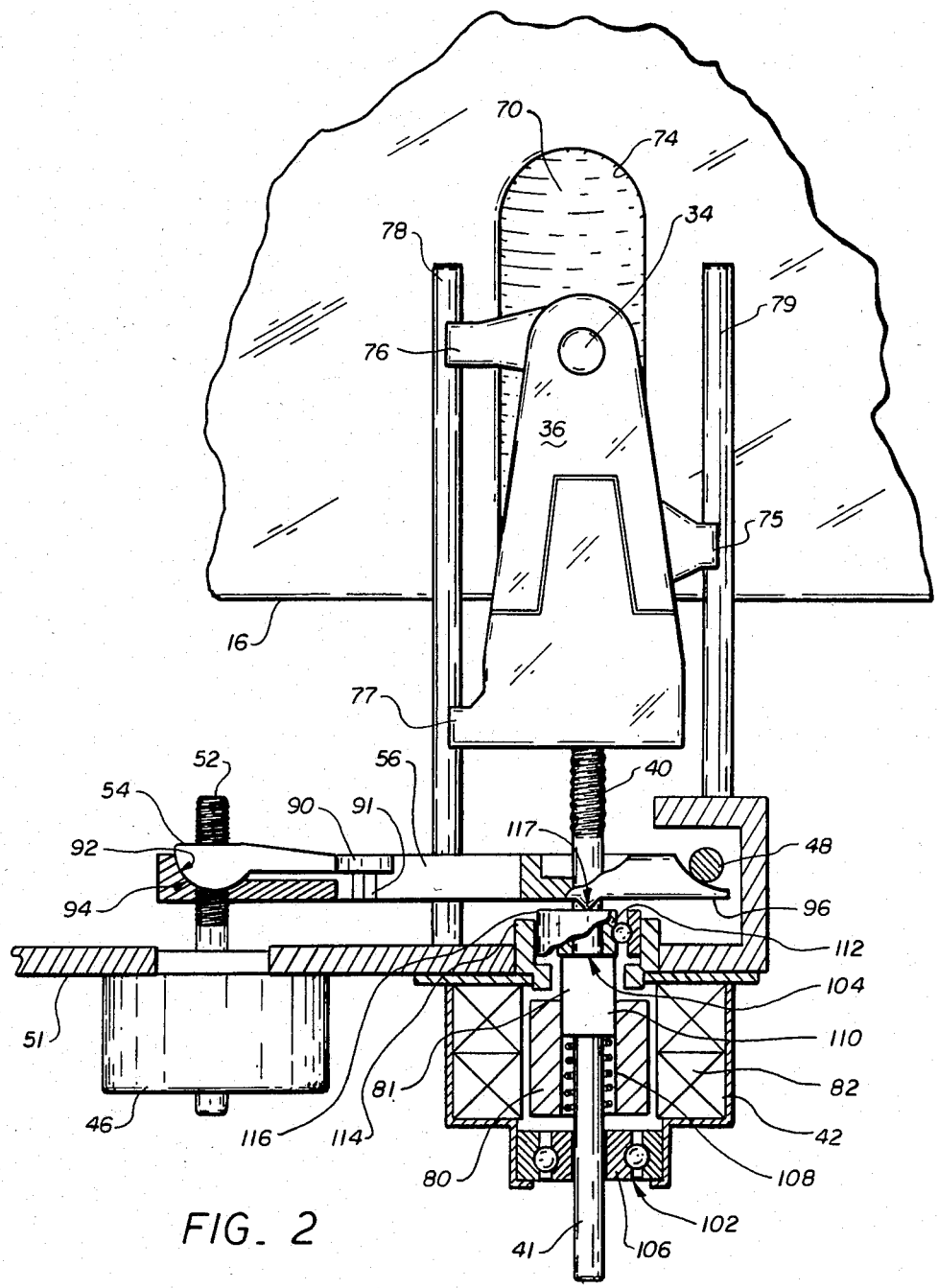
FIG. 2 is a top view of the electro-mechanical adder of the present invention showing the cut away view 2—2 of FIG. 1.

Referring now to FIG. 2, the linear adder assembly is shown to comprise the coarse stepper motor 42 and the fine stepper motor 46 mechanically linked together by the lever arm 56 so that motion of the read/write head 34 is the sum or difference of the motions of the two lead screws 40 and 52. The floppy disk 70, inside the square disk envelope 16, is accessed by the read/write heads through elongate access slots 74 in the disk envelope.

In use, the floppy disk is caused to rotate in the protective envelope, and the read/write heads follow one particular track on the floppy disk which is accessed through the access slot. Since the floppy disk may have been eccentrically clamped or may have distorsions due to temperature or humidity variations, the read/write head carriage drive mechanism must respond rapidly to variations in the location of the track being read as the disk spins relative to the read/write heads. When a track is read from, or written onto the floppy disk, the coarse stepper motor moves the read/write head carriage to the approximate location of the desired track in response to the disk drive controller. As will be explained below, the fine stepper motor controller is then provided with continuous feedback from information that is prerecorded on the floppy disk and accuated as required to the read/write heads to move toward and then precisely follow the centerline of a given track.

The read/write head carriage 36 is supported at three points 75, 76 and 77 on two substantially parallel carriage guide rails 78 and 79. The read/write head carriage can move inwardly, toward the center of the disk, or outwardly in a direction parallel to the rails. The first lead screw is threadably engaged to a lead screw nut that is connected to the read/write head carriage so as to move it radially inwardly and outwardly in response to rotation caused by the first stepper motor 42. The lead screw is directly connected to and is an extension of the rotor 80 of stepper motor 42. The stepper motor has a stationary stator 82, but its rotor 80 and the lead screw 40 are axially translatable and are urged radially inwardly toward the disk by a spring 108.

The shaft end 41 of lead screw 40 is attached to rotor 80 at 81 and passes through a first ball bearing assembly 102 and a second ball bearing assembly 104. Shaft 41 is adapted to slip axially relative to the inner race 106 of the first ball bearing assembly. Spring 108 bears against the inner race 106 and a collar 110 attached to the shaft 41 and transmits its spring force to the shaft. Movement of the shaft 41 moves the entire ball bearing assembly 104 within the second ball bearing stator housing 114. The outer race 116 of the bearing 104 is engaged by detents 117 formed on lever arm 56. Lever arm 56 thus moves the second ball bearing assembly 104, the shaft 41 and lead screw 40, and the read/write head carriage 36 radially inwardly and outwardly in response to a force transmitted from the second stepper motor 46.

As the second lead screw 52 is rotated, the second lead screw follower 54 tends to rotate as well. However, the second lead screw follower is prevented from rotating by its engagement with the nut stop key 54 which has an extension arm 90 that is firmly held between retaining members 91 formed on the inner surfaces of the lever arm 56. The surface 92 of the nut stop key that engages the surface 94 of lever arm 56 is spherically shaped, as is the engaged lever arm socket 94. This allows the key 54 to rotate within socket 94 relative to lever arm 56 as the free end of the lever arm 56 is moved inwardly and outwardly by lead screw 52.

Lever arm 56 is forced against the pivot post 48 and the nut stop key 54 by the force of the bias spring 108. This force is sufficient to maintain engagement of the nut stop key 54 with the lever arm 56, and the pivot post 4 with the lever arm 56 even though the pivot end 96 of lever arm 56 is not secured to the pivot post.

The first stepper motor 42 steps only upon command of a control unit operated in an open loop. The second stepper motor 46 is stepped by track following control circuits operating in a closed loop. When linked together as shown, the head carriage can be independently moved by either stepper motor and head carriage movement and thus its position is equal to the sum or difference of the stepped positions of the two stepper motors.

To recap, the second ball bearing assembly 104 is free to slide in the axial direction in the stepper motor stator housing 114. The spring 108 biases the shaft 41 and lead screw 40 toward the center of the inserted disk 16. Motor 42 functions as a conventional stepper motor except that its rotor is axially translatable.

Rotation of the fine stepper motor 46 causes the lever to pivot in or out depending upon the step direction. The corresponding movement of the lever 56 at the points 117 where it bears against the front bearing 104 of the coarse stepper motor 42 translates the rotor 80 and lead screw 40 in an axial direction which also moves the head carriage 36 by the same small amount. The second stepper motor axially moves the lead screw 40 and rotor 80 without altering the rotational position or affecting the step function of motor 42.

The disks used in the preferred embodiment are formatted as depicted in FIG. 3 to allow the read/write heads to follow a particular track. Each track (shown as 000–005) starts with an index burst "I". The remainder of the track is divided into a number of sectors. Each sector of each track includes a series of servo bursts "S", a sector identification burst "ID" and a segment for stored "User Data". Gaps are identified as G1 between the index and the first sector, G2 between the ID and User Data and G3 at the end of the User Data segment.

The servo bursts are identified as bursts A, which straddle the outer boundary of track 000 and each fourth track thereafter, bursts B, which straddle the outer boundary of track 001 and each fourth track thereafter, bursts C, which straddle the outer boundary of track 002 and each track thereafter, and bursts D, which straddle the outer boundary of track 003 and each fourth track thereafter. Each servo burst is divided into two parts, the identification burst, hereinafter "IB", and the amplitude sample hereinafter referred to as "AS" (refer to FIGS. 4A and 4B). The identification burst has a series of unique subbursts, each lasting 5 micro seconds. Burst A has five subbursts, burst B has three, burst C has six, and burst D has four.

As the disk rotates in the direction designated ω, two adjacent ones of the four possible servo bursts A–D will be read by a head. Since two servo bursts are read in sequence in normal "on track" operation, there are four unique servo burst IB codes, AB, AD, CB, CD.

In FIG. 3, only 6 tracks are shown, i.e., 000 to 005, but the principles discussed apply to any arbitrary number of tracks. Assume, for the following discussion, that a read/write head is to be positioned over track 002. The head is initially driven into the vicinity of the centerline of track 002 by the open loop coarse stepper motor 42. As the disk rotates, the head reads the servo bursts S (refer to FIG. 4A and 4B). The correct servo bursts for track 002 are C/D. As the head follows the track centerline, it will ideally read one-half of the two separate servo bursts C and D. The micro processor can identify the track by counting the subbursts and can tell how well the head is following a given track by the difference between the amplitudes of the two bursts and can make adjustments in the head location by accuating the fine stepper motor. Since the servo burst pattern repeats every four tracks, the head position can be identified to within plus or minus two tracks. Therefore, if the head is positioned within plus or minus two tracks of the selected track 002, the position error will be identified and the fine stepper motor will be used to correct the error by fine increments or steps.

Referring now to FIG. 5, an oscilliscope tracing of burst voltage versus time shows how the voltage of adjacent bursts varies if the read/write head is not accurately aligned. Two consecutive servo bursts, in this case C and D, are read. The voltage of each burst is directly proportional to the amount of burst read by the head. Since a correctly aligned head should read as much as C as D, the on centerline plot (FIG. 5B) shows each burst having equal amplitude. If the head is misaligned, one-half of the servo burst amplitude will thus be greater than the other. In FIG. 5C, the head is misaligned 500 microinches out, and reads a higher voltage from C than D. In FIG. 5D, the head is misaligned 500 microinches in, and reads a higher voltage from D than C. From these readings, the electronics of the closed-loop servo system can move the head in or out to equalize the voltages read. Each time the head passes a servo burst it is realigned to accurately follow the center of the track.

Once the position of the head is corrected, data is read from the Use Data segment of the track until the next servo burst when the head position is again verified and corrected if incorrect.

In FIG. 6 a block diagram is shown of the drive control system. In operating, the first stepper motor is caused to move the head carriage to an approximate track center line position in response to step pulses received from a control unit 120, much as in a conventional disk drive. The read signal from the head 122 are amplified, filtered and digitized and the digitized pulses are transmitted to a state machine 124. State machine 124 detects and counts all bits with the unique 5 micro second period, identifies the servo "IB" as an "A" or "C" burst, and gates "On" a peak detector 126 through the detect command "A" or "C" line. The peak detector 126 accepts the sample "AS" data for the gated period from the analog data line and measures and stores the peak amplitude. The sequence is then repeated for the "B" or "D" burst. A comparator 128 measures the voltage ratio of the two stored bursts and transmits the voltage ratio status to a micro computer 130. The state machine 124 has also gated "on" the microcomputer 130 to accept the ratio status and to receive and store the servo burst ID code. The microcomputer compares the stored burst ID code with the actual track number, which is generated by counting the step pulses from the control unit 120.

If the servo burst ID code is not the same as the actual track address number, microcomputer 130 will issue step pulses to the fine stepper motor 46 to move the head towards the correct track. This procedure is repeated in each sector that the servo burst code is not the same as the track address number.

The voltage amplitude ratio is A or C peak amplitude sample "IS" divided by the B or D peak amplitude sample "AS". The ratio status is identified by comparator 128 as one of three states; greater than 1.10, between 1.10 and 0.90, and less than 0.90. If the ratio is between 0.90 and 1.10, then the head is determined to be located in the "no step zone" and no step pulses will be issued by the microcomputer to the fine stepper motor. If the ratio is greater than 1.10, the microcomputer will step the head in towards the center of the disk one step per sector until the ratio is between 1.10 and 0.90 which denotes the "no step zone". If the ratio is less than 0.90, the head will be stepped out in the same manner to the "no step zone". In any case, when the "no step zone" is detected, the micro computer issues a "drive ready" signal to the control unit 120. The head will thus accurately follow the track and data can now be successfully recorded or played back.

The control unit 120 issues "write data" to the write driver 132 during a record operation. Write driver 132 in turn transmits current pulses to the write coil of the read/write head 122. For read, the digital data is transmitted to the control unit 120 directly from the data detector.

As indicated above, the two stepper motors are accuated by control circuits comprised of the open loop circuit 43 and the closed loop circuit 47. The first stepper motor 42 steps only upon command of the control unit 120 and to the vicinity of the desired track. The second stepper motor 46 moves the carriage toward the track centerline and then follows the correct track in response to data read off the disk. The two motions of the first and second stepper motors are mechanically added by the mechanical adder 56 as previously discussed.

As an example, although numbers are provided for a 5.25" disk having 192 tracks per inch or quadruple density, the pitch of the lead screws, track density and lever ratio can all be changed without affecting the spirit or scope of this invention.

At 192 tracks per inch, the first stepper motor rotates 15 degrees each step, or 24 steps per revolution. Each single step distance of the head carriage is 1/192=0.0052 inches which is the track pitch. One revolution of the stepper motor 42 moves the head carriage 24×0.0052=0.125 inch. This is also the "lead" of the lead screw 40.

The second stepper motor also rotates 15 degrees each step, or 24 steps per revolution. However, the "lead" of the lead screw 52 is 0.025 inches per revolution. Therefore, each step moves the distal end of the lever 56 0.025/24=0.00104 inches. The lever ratio is the length from the lever pivot post 48 to the first stepper motor lead screw centerline (at 117) divided by the length from the lever pivot to the second stepper motor lead screw centerline. This ratio is 0.192. Therefore, when the fine stepper motor is stepped one time, the coarse stepper motor and the head carriage is moved axially 0.00104×0.192=0.0002 inch, which is defined as the fine step distance. This distance is selected by doing a tolerance analysis of the entire system including disk eccentricities caused by clamping errors, hub eccentricity, Mylar thermal and hydroscopic characteristics, lead screw error, frame expansion, etc. By selecting the worst case eccentricity expected and using this as the step change distance, it can be assured that after the first centerline crossing the system will never be off track centerline more than such distance.

The fine stepper motor 46 can have a rotational stop preferably limiting the rotation to ±22 steps which equals +22×0.0002=+0.0044 inch of head travel for track following. This amount of travel must be greater than the maximum amount of track misalignment for a readable disk. When the drive is to be used in the open loop mode for reading 48 and 96 tracks per inch disks, the fine stepper motor is positioned at the midpoint of rotation which locates the head at the nominal track centerline.

The disk is prerecorded at the factory with the sector format. Each track is divided into sixteen to thirty-two sectors depending upon the users requirements. Each sector begins with prerecorded servo information and the track and sector addresses. All data is recorded in the region between the sector marks leaving the prerecorded servo information intact.

Referring to FIG. 7, if the tracking ability of the closed loop stepper motor is graphically depicted by assuming a perfectly circular track is a straight line, then one type of off-center track can be depicted as a sinusoidal line such as that illustrated at 140. The broken line 142 represents the track that the center of a read/write head would follow using the present invention. Note that the track 142 moves toward the misaligned track centerline 140 in increments of 0.0002 inch per sector until track 140 is crossed at 144. All small corrections after the initial track acquisition are made by the second stepper motor. Whenever the head is not in the "no step zone", it is moved providing constant accurate tracking of the particular track.

In an additional embodiment of this invention, the deviation of a sample track from circular is calculated and such information is placed into the memory of a micro computer when the disk is first inserted in the disk drive. Since temperature and humidity change the disks shape very slowly, all errors in the shape of the disk can be assumed to be constant. This then provides the data for the closed loop alignment circuit and the necessity of constant recalculation of the position of the read/write head can be avoided, and the head will be constantly repositioned without the phase delay required for the continuous recalculation of where the head should be based on the servo information recorded on the disk.

As will be clear to those skilled in the art, modifications and changes may be made to the disclosed embodiments without departing from the inventive concepts thereof. The above description is intended as illustrative and informative, but not limiting in scope. Accordingly, it is intended that the following claims be interpreted to cover all modifications that reasonably fall within the scope of the invention.

What is claimed is:

1. Apparatus for positioning a read/write head over a rotating disk of magnetic or other data storage media comprising:

a first stepper motor means having a first rotor and a first stator;

a first lead screw means driveably coupled to said first rotor for moving a read/write head moveably mounted on at least one rail disposed parallel to the longitudinal axis of said first lead screw means, said movement being inwardly and outwardly relative to the center of the disk in unitary steps of coarse increments;

a second stepper motor means having a second rotor and a second stator;

a second lead screw means coupled to said second rotor for causing movement of said read/write head in unitary steps of fine increment;

first journalling means connected to said first lead screw means;

a lead screw follower connected to said second lead screw means;

means forming a pivot point located such that said first lead screw means is positioned between said second lead screw means and said pivot point; and an elongated lever arm having a first end portion engaging said second lead screw follower, an intermediate portion engaging said journalling means, and a second end portion bearing against said pivot point, whereby said read/write head is directly moved by actuation of said first stepper motor means as it rotates said first lead screw means and is indirectly moved by actuation of said second stepper motor means which through rotation of said second lead screw means causes pivoting movement of said lever arm about said pivot point which in turn causes incremental axial translation of said first lead screw means and consequent incremental movement of said read/write head.

2. Apparatus as recited in claim 1 wherein said first lead screw means is an extension of the shaft of said first rotor and said first journalling means journalls one end of said first rotor to said first stator, said first rotor and said first journalling means being axially translatable relative to said first stator.

3. Apparatus as recited in claim 2 wherein said first end portion of said lever arm has a spherically concave surface formed therein, and said lead screw follower has a spherically convex surface for mating with said concave surface, and wherein said lead screw follower also has a stop key for engaging a stop surface formed in said lever so as to prevent rotation of said follower in a plane generally normal to the axis of said second lead screw means.

4. Apparatus as recited in claim 1 wherein said first journalling means is journalled to one end of said first rotor and is axially translatable with said first rotor relative to said first stator, said first journalling means serving as a means for transmitting pivotal motion of said lever arm to axially translational motion of said first rotor and said first lead screw means.

5. Apparatus as recited in claim 3 wherein said first stepper motor means includes a second journalling means fixed in position relative to said first stator for journalling the other end of said first rotor to said first stator, and resilient means bearing against said second journalling means and said first rotor thereby causing continuous following engagement between said first journalling means and said intermediate portion of said lever arm.

6. Apparatus as recited in claim 5 wherein said first stator and said second stator are rigidly attached to a common base.

7. Apparatus as recited in claim 6 wherein the longitudinal axes of said first lead screw means and said second lead screw means are disposed in parallel relationship to each other.

8. Apparatus as recited in claims 1 or 7 wherein the disks of data storage media have encoded thereon servo information identifying each of a plurality of concentric tracks and each of a plurality of sectors, and said apparatus comprising a closed loop servo positioning circuit that detects such servo information and accuates said second stepper motor to incrementally rotate said second lead screw means so as to cause said read/write head to incrementally move toward the centerline of a track being accessed.

9. Apparatus as recited in claim 8 wherein said servo information includes a particular servo code for each track that is repeated at the start of each sector.

10. Apparatus as recited in claim 9 wherein said particular servo code has four values with each such code value being assigned to one of four adjacent tracks and being sequentially repeated every fourth track.

11. Apparatus as recited in claim 1 wherein said rotating disk forms a replaceable part of said apparatus and the storage media of said disk is previously prepared to have a plurality of concentric recording tracks with embedded servo bursts, said bursts being configured such that when detected by a read/write head positioned on a particular track centerline will cause the generation of a signal that will have a first characteristic, when the head is positioned on one side of said centerline will have a second characteristic, and when positioned on the other side of said centerline will have a third characteristic, said apparatus further comprises a closed loop detection circuit for monitoring the output of said read/write head and developing a first signal for driving said second stepper motor in one direction when said second characteristic is detected, and developing a second signal for driving said second stepper motor in the opposite direction when said third characteristic is detected, thereby causing said read/write head to continuously follow said track centerline.

12. Apparatus as recited in claim 11 wherein said bursts are in the form of detectable indicia occupying an inner side portion of a first radial segment of said track and the outer side portion of an adjacent second radial sement of said track such that a signal detected by a read/write head moving along said centerline will be comprised of two serial data bursts of equal signal magnitude, whereas a read/write head moving along the inner side of said track will detect a signal comprised of a first data burst of a relatively large signal magnitude followed by a second data burst of a relatively small signal magnitude, and whereas a read/write head moving along the outer side of said track will detect a signal comprised of a first data burst of a relatively small signal magnitude followed by a second data burst of a relatively large signal magnitude.

13. Apparatus as recited in claim 12 wherein tracks immediately adjacent to said particular track have said detectable indicia occupying the outer side portions of their corresponding first radial segments and the inner side portions of their corresponding second radial segments.

14. Apparatus as recited in claim 13 wherein said first journalling means is journalled to one end of said first rotor and is axially translatable with said first rotor relative to said first stator, said first journalling means serving as a means for transmitting pivotal motion of said lever arm to axially translational motion of said first rotor and said first lead screw means.

15. Apparatus as recited in claim 1 wherein the distance of said incremental movement of said head is selected to be equal to the statistical worst case disk eccentricity error.

16. Apparatus as recited in claim 15 wherein the said incremental movement of said head is caused by a one step increment of said second stepper motor means.

* * * * *